(12) United States Patent
Martin et al.

(10) Patent No.: US 7,832,342 B2
(45) Date of Patent: Nov. 16, 2010

(54) PROCESS FOR COMBUSTING FUELS, IN PARTICULAR WASTE

(75) Inventors: Johannes Martin, München (DE); Oliver Gohlke, München (DE); Masao Takuma, Tokyo (JP); Minoru Kuranishi, Yokohama (JP); Yoshio Yanagisawa, Yokohama (JP)

(73) Assignees: Martin GmbH für Umwelt-und Energietechnik, München (DE); Mitsubishi Heavy Industries, Ltd., Tokyo (JP)

( * ) Notice: Subject to any disclaimer, the term of this patent is extended or adjusted under 35 U.S.C. 154(b) by 381 days.

(21) Appl. No.: 11/367,225

(22) Filed: Mar. 3, 2006

(65) Prior Publication Data

US 2006/0196400 A1    Sep. 7, 2006

(30) Foreign Application Priority Data

Mar. 4, 2005   (DE)   ................ 10 2005 009 957

(51) Int. Cl.
*F23B 70/00* (2006.01)
(52) U.S. Cl. .............. 110/204; 110/210; 110/214; 110/346
(58) Field of Classification Search ............ 110/210, 110/213, 214, 216, 190, 204, 346, 347, 248; 431/10, 12
See application file for complete search history.

(56) References Cited

U.S. PATENT DOCUMENTS

| | | | | |
|---|---|---|---|---|
| 3,651,771 A | * | 3/1972 | Eberle | 110/213 |
| 3,669,039 A | * | 6/1972 | Leman | 110/204 |
| 4,838,183 A | * | 6/1989 | Tsaveras et al. | 110/190 |
| 5,105,747 A | * | 4/1992 | Khinkis et al. | 110/345 |
| 5,241,916 A | * | 9/1993 | Martin | 110/348 |
| 5,261,337 A | * | 11/1993 | Orita et al. | 110/346 |
| 5,606,924 A | * | 3/1997 | Martin et al. | 110/341 |
| 7,597,864 B2 | * | 10/2009 | Breen et al. | 423/212 |

FOREIGN PATENT DOCUMENTS

| | | |
|---|---|---|
| DE | 39 15 992 | 11/1989 |
| DE | 40 27 908 | 3/1992 |
| DE | 43 12 820 | 10/1994 |
| DE | 100 12 895 | 9/2001 |
| DE | 100 51 733 | 5/2002 |
| EP | 0 498 014 | 8/1992 |
| EP | 0 621 448 | 10/1994 |
| JP | 04-359705 | 12/1992 |
| JP | 5010518 | 1/1993 |
| JP | 2002-267132 | 9/2002 |
| WO | WO 2004/092648 | 10/2004 |

\* cited by examiner

*Primary Examiner*—Kenneth B Rinehart
(74) *Attorney, Agent, or Firm*—Cohen Pontani Lieberman & Pavane LLP

(57) ABSTRACT

A process for combusting fuels, in particular waste, includes reducing the oxygen mass flow of the underfire combustion gas and increasing the oxygen mass flow of the overfire combustion gas in the event of an increase in the reaction rate or combustion intensity.

18 Claims, 1 Drawing Sheet

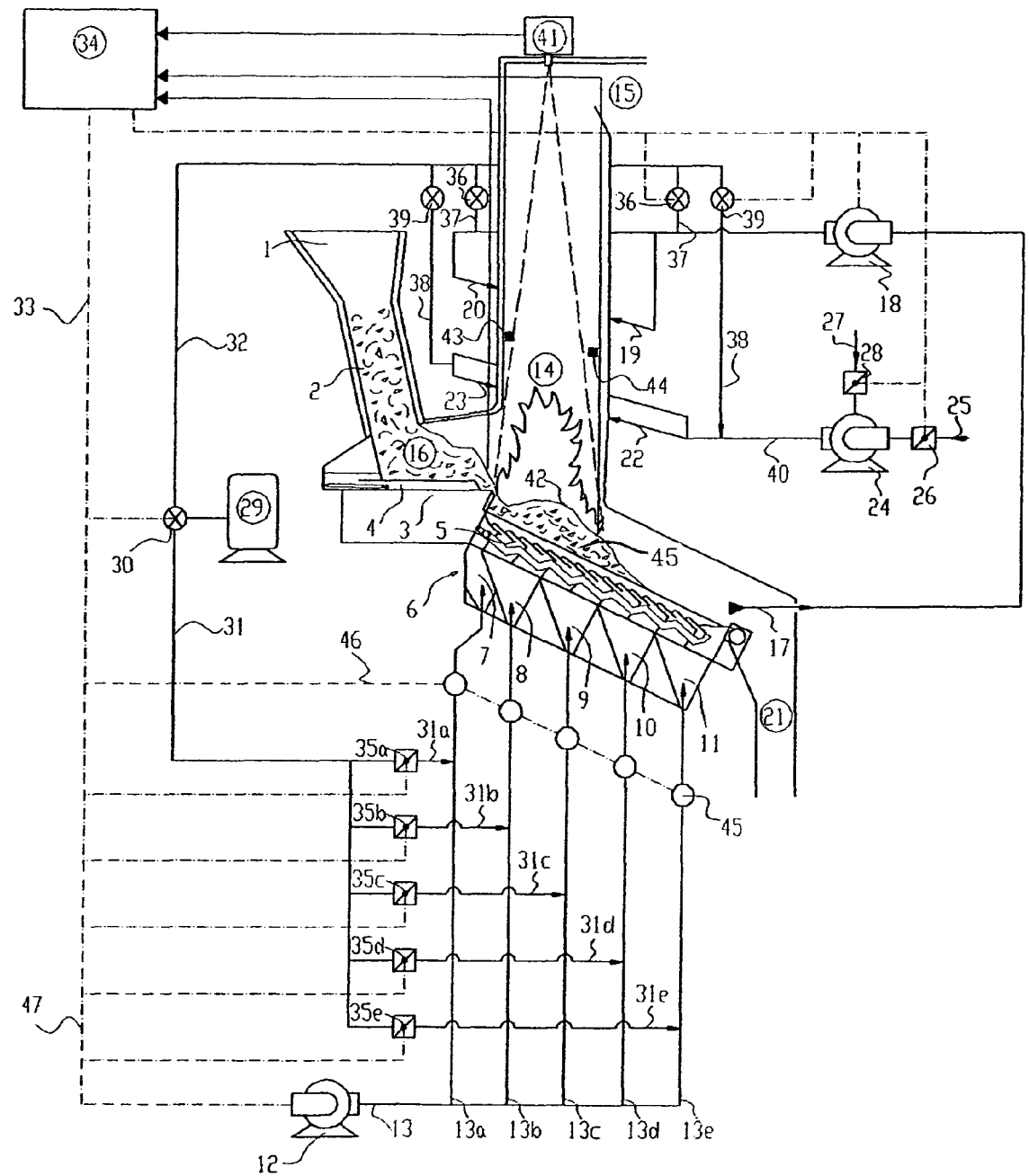

PROCESS FOR COMBUSTING FUELS, IN PARTICULAR WASTE

BACKGROUND OF THE INVENTION

1. Field of the Invention

The invention relates to a process for combusting fuels, in particular waste, in which underfire combustion gas is introduced into the fuel bed from below and overfire combustion gas is introduced into the flue gas flow above the fuel bed.

2. Description of the Related Art

Underfire combustion gas is usually ambient air or ambient air enriched with oxygen that is often warmed before it is introduced into the fuel bed. Oxygen is added to ambient air to produce underfire combustion gas in order to increase combustion intensity, reduce flue gas flow and, in particular, to increase fuel bed temperature and thus improve bottom ash quality.

Changes in fuel composition, i.e. changes also in the heating value of the waste, result inevitably in fluctuations both in the composition and flow of the flue gas during combustion. Fluctuation of the flue gas flow is undesirable because the maximum possible fluctuation must be taken into account in the design and operation of a combustion plant, and this requires a correspondingly uneconomical design of the induced draft fan. The consequence of fluctuation in the oxygen content in the flue gas is that, in the event of a temporary increase in the heating value of the fuel mixture fed, oxygen deficiency occurs and this results in an increase in carbon monoxide (CO) or in other products of incomplete combustion in the flue gas (CO peaks). The plant must therefore be designed for and operated with high levels of excess air if inhomogeneous fuels are used. However, high levels of excess air lead to increased flue gas flow and this requires not only a larger induced draft fan but also larger downstream flue gas cleaning systems.

A temporary increase in the heating value of the fuel mix fed intensifies the negative effect of flue gas fluctuations and leads to premature ignition of the fuel mix, an increased reaction rate, i.e., greater combustion intensity and heat release per unit of time, a decrease in excess air, and an increase in gas temperature. These produce unstable conditions. This effect is particularly pronounced if ambient air enriched with oxygen is used as the underfire combustion gas. The increased oxygen content results in altogether more intensive combustion and more rapid ignition of the fuel after feeding. If, at the same time, the heating value of the fuel mixture feed increases temporarily, oxygen consumption can rise sharply due to the intensive combustion reaction so that, despite oxygen enrichment, oxygen-deficient combustion conditions arise, at least locally. Such instabilities or fluctuations in the combustion process are extremely undesirable because of the effects described above.

SUMMARY OF THE INVENTION

An object of the invention is to stabilize the combustion process despite fluctuating heating values due to differing fuel compositions.

According to the invention, this object is achieved by using a process of the kind described above, in that the oxygen mass flow of the underfire combustion gas is reduced and the oxygen mass flow of the overfire combustion gas is increased in the event of an increase in the combustion rate.

This regulation effect is achieved substantially by changing the composition with regard to the oxygen content of the underfire combustion gas and of the overfire combustion gas while largely maintaining the mass flows of these combustion gases, or by changing the mass flows of the underfire combustion gas and of the overfire combustion gas, or by a combination of both measures.

Reducing the oxygen content while substantially maintaining the same mass flow of the underfire combustion gas prevents overly rapid ignition and consequently an increased reaction rate and heat release per unit of time in the event of temporary feeding of fuel mixtures with a high heating value. As a result of the reduced supply of oxygen in the underfire combustion gas, the fuel burning rate is also limited so that predominantly gasification reactions and few combustion reactions take place. This leads to cooling of the primary combustion zone and further slowing of the fuel burning rate.

Primary combustion zone denotes the area between the grate and the lowest overfire gas nozzle levels.

The corresponding increase in the oxygen content in the overfire combustion gas with substantially unchanged overfire combustion gas mass flow also facilitates reliable burnout of the gasification products rising in the furnace.

Oxygen balancing between the underfire and the overfire combustion gas as described herein results in total in a lessening of the fluctuations in the flue gas composition attributable to inhomogeneous fuel and enables the level of excess air to be reduced. In this way, a combustion plant can also be operated with inhomogeneous fuel and excess air of less than 1.5 without the occurrence of CO peaks in the flue gas due to the feeding of fuel compositions with at times a higher heating value.

Preferably, regulation takes place in such a manner that a temporary increase in the oxygen mass flow in the overfire combustion gas corresponds substantially to a temporary decrease in the oxygen mass flow in the underfire combustion gas. This is particularly advantageous in helping to maintain unchanged flue gas flows.

To establish the extent of the increase in the reaction rate and combustion intensity, at least one of the following parameters—fuel bed temperature, temperature, oxygen ($O_2$) content, carbon dioxide ($CO_2$) content, CO content in the flue gas—is measured and the, values measured are used to regulate the oxygen mass flow in the underfire combustion gas and in the overfire combustion gas. The temperature of the fuel bed is measured preferably by means of an infrared camera in the roof of the furnace. The temperature and the $O_2$, $CO_2$ and CO content in the flue gas are measured preferably by means of in-situ measuring devices that are, for example, based on the absorption of laser light, and that enable rapid signals to be generated in the furnace. Also suitable are optical cameras that permit measurement of the temperature distribution in the furnace.

This kind of regulation according to the invention is based on the capture of critical values of the underfire combustion gas and of the overfire combustion gas relating to mass flow composition and temperature. These values must inevitably be obtained during operation of a combustion plant so that it is possible, on the basis of this information, to make the appropriate changes in the underfire combustion gas and in the overfire combustion gas as a function of the reaction rate and combustion intensity.

In the process according to the invention, different compositions can be selected with regard to the underfire combustion gas and the overfire combustion gas.

As already known, it is possible to use ambient air or oxygen-enriched ambient air, preheated in most cases, as the underfire combustion gas. It is advantageous if the oxygen content in the underfire combustion gas is greater than about 21% by volume.

The overfire combustion gas may be ambient air, known as overfire combustion air, internally recirculated flue gas extracted at a point in the furnace where there is still a high oxygen content, recirculated flue gas extracted at the outlet of the boiler or further downstream at the outlet of the flue gas cleaning systems, or mixtures of the named components.

In a further configuration of the invention, it is expedient to introduce cleaned recirculated flue gas into the flue gas flow above the primary combustion zone for homogenization and cooling.

Furthermore, it is expedient to introduce ambient air or internally recirculated flue gas at an injection level of approximately 6 to 9 meters above the grate so that the residence times of the flue gas between the fuel bed and this level is about 1to 3seconds. In this way a time gain is achieved for the regulation system that, according to the invention, reacts, for example, to increased combustion intensity by increasing the oxygen content in the overfire combustion gas so that burnout of the CO produced can still take place.

According to the invention, a particular sensitive and rapid-response regulation option derives from the fact that the oxygen mass flow in the underfire combustion gas is reduced at the location of increased combustion intensity and the oxygen mass flow in the overfire combustion gas directly above the location of increased combustion intensity is increased. However, this kind of regulation that responds particularly quickly to changes as they occur, and therefore directly suppresses the fluctuations described above, requires a further inventive measure that consists of measuring at least one of the following parameters—direct fuel bed temperature, temperature, oxygen content, $CO_2$ content, CO content in the flue gas in a primary combustion zone that forms directly above the fuel bed—to establish the location and extent of increased combustion intensity, and of using the values measured to regulate the oxygen mass flow in the underfire combustion gas and in the overfire combustion gas. Measurements should be made at several points to establish the location of increased combustion intensity as accurately as possible.

Oxygen balancing between the underfire combustion gas and the overfire combustion gas can be achieved by reducing the underfire combustion gas flow and by increasing the overfire combustion gas flow because the oxygen mass flow is changed by such increase or decrease, regardless of the current oxygen content. Oxygen balancing between the underfire combustion gas and the overfire combustion gas can, however, also be achieved by reducing the oxygen content in the underfire combustion gas and increasing the oxygen content in at least one component of the overfire combustion gas. With this measure, the gas flows remain constant but the oxygen content in the gas flows changes.

Oxygen balancing between the underfire combustion gas and the overfire combustion gas can also be achieved by regulating the flow of the internally recirculated flue gas introduced. This measure causes underfire combustion gas to be extracted in the primary combustion zone, thus reducing the oxygen mass flow in this zone and therefore also the reaction rate. Regulating the flow of the extracted internally recirculated flue gas therefore has an indirect effect on the oxygen mass flow that is made available in the primary combustion zone and that is influenced by changing the internally recirculated flue gas flow, to the extent that underfire combustion air, and therefore oxygen, is extracted if the internally recirculated flue gas flow increases in the primary combustion zone.

The oxygen mass flow in the overfire combustion gas is increased advantageously in an area of increased turbulence. This is particularly advantageous not only when local oxygen balancing is not possible due to design features but also when oxygen mass flows are balanced directly in the area where increased combustion intensity develops, because here too it is ensured that in particular CO gas veins cannot pass by unaffected.

The overfire combustion gas is preferably introduced into an area of the furnace where increased turbulence is achieved by means of a narrowing of the furnace.

It can also be advantageous to introduce the various parts of the overfire combustion gas at different heights above the fuel bed because specific changes can then be achieved. For example, it is advantageous to introduce the internally recirculated flue gas at a different location than the cleaned flue gas that is introduced to achieve a certain turbulence rather than to regulate the oxygen mass flow. The internally recirculated flue gas is preferably introduced at a higher point than the cleaned flue gas. If necessary, ambient air can be added to the internally recirculated flue gas.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWING

The FIGURE shows the basic layout of a waste-to-energy plant with reverse-acting grate and the various means of influencing underfire combustion gas and overfire combustion gas.

DETAILED DESCRIPTION OF THE PRESENTLY PREFERRED EMBODIMENTS

As shown in the FIGURE, a combustion plant for conducting the process described has a feed hopper 1 followed by a feed chute 2 for supplying the fuel to a feed table 3 on which feed rams 4 that can be moved to and fro are provided to convey the fuel arriving from the feed chute 2 onto a combustion grate 5 on which combustion of the fuel takes place. The combustion grate 5 can be sloped or horizontal.

The process described below can also be used in, for example, a fluidized bed combustion plant, not shown.

Below the combustion grate 5 is arranged a device, denoted in its totality by 6, that supplies underfire combustion gas and that can include several chambers 7, 8, 9, 10, 11 into which underfire combustion gas in the form of ambient air is introduced via a duct 13 by means of a fan 12. Through the arrangement of the chambers 7, 8, 9, 10, 11, the combustion grate 5 is divided into several undergrate air zones so that the underfire combustion gas can be adjusted to different settings according to the requirements on the combustion grate 5. Depending on the width of the combustion grate 5, these undergrate air zones can also be divided transversally so that the underfire combustion gas can be regulated in accordance with local circumstances.

Above the combustion grate 5 is the furnace 14, the upper part of which leads into a flue gas pass 15 which is followed by apparatuses that are not shown, such as an extraction stack and a flue gas cleaning system.

Combustion of the fuel denoted by 16 takes place on the front part of the combustion grate 5 above which the flue gas pass 15 is located. Most of the underfire combustion gas is introduced into this area via the chambers 7, 8 and 9. On the rear part of the combustion grate 5 there is only burned-out fuel, or bottom ash. Underfire combustion gas is introduced into this area via the chambers 10 and 11 primarily to cool the bottom ash. For this reason, the flue gas in the rear area of the furnace has a higher oxygen content than the flue gas in the front area so that this flue gas can be used as internally recirculated flue gas for secondary combustion when circumstances require.

For this purpose, an extraction duct 17 is provided that leads to an induced draft fan 18 that directs the internally recirculated flue gas to the overfire combustion nozzles 19 and 20 that are arranged opposite each other or at interjacent positions in the flue gas pass 15.

The burned-out parts of the fuel then fall into a discharger 21 at the end of the combustion grate 5.

Further overfire combustion gas nozzles 22 and 23 are also distributed in large number over the circumference of the flue gas pass 15. Here, overfire combustion gas can be introduced in the form of ambient air conveyed by means of a fan 24. For this purpose, an intake duct 25 is provided and a regulating device 26 allows setting of the ambient air flow. A further duct 27 monitored by a regulating device 28 and connected to the fan 24 serves to extract cleaned recirculated flue gas which is added to the ambient air. After the flue gas has flowed through the flue gas cleaning system, the cleaned recirculated flue gas is extracted; it has a lower oxygen content than the internally recirculated flue gas. This recirculated flue gas serves primarily to generate sufficient turbulence to improve combustion in the secondary combustion area when the flue gas flow in the flue gas pass 15 is too low.

From an air separation plant 29, pure oxygen is transported by a conveying and distribution apparatus 30 to a duct 31 for mixing with the underfire combustion gas and to a duct 32 for mixing with the overfire combustion gas. The corresponding control command arrives via a line 33 from a central and combined control and computer unit 34 whose task is explained in more detail below. Branch ducts 31a to 31e that are monitored by the valves 35a to 35e and that are also influenced by the control and computer unit 34 are supplied via the duct 31. The supply ducts 31a to 31e end in the branch ducts 13a to 13e that branch off from the duct 13 for ambient air and lead to the individual undergrate air zones 7 to 11.

The second duct 32 that originates from the conveying and distribution apparatus 30 leads via the control valves 36 and the ducts 37 to the overfire combustion gas nozzles 19 and 20 via which internally recirculated flue gas is introduced into the combustion furnace. Via the branch ducts 38 monitored by the control valves 39, oxygen can be supplied to the overfire combustion gas nozzles 22 and 23 to which overfire combustion gas is supplied via the duct 40 by means of the fan 24. This gas can be either ambient air or ambient air mixed with cleaned flue gas.

A thermography camera 41 observes the surface 42 of the fuel bed 45 through the flue gases and transfers the values captured to the central control and computer unit 34. Several sensors denoted by 43 and 44 are arranged above the surface 42 of the fuel bed 45 and serve to measure the $O_2$, CO and $CO_2$ content in the flue gas above the fuel bed 45, i.e. in the primary combustion zone.

To improve readability of the FIGURE, all ducts and lines used to distribute flow media or transfer captured data are indicated by continuous lines whereas lines that transmit control commands are indicated by dashed lines.

The regulation process according to the invention is explained below.

When, in a specific area of the combustion grate 5, there is an increase in combustion intensity due to the presence of particularly inflammable fuel with a high heating value, and the thermography camera 41 detects an increased temperature at the fuel bed surface 42 and at the same time a reduction in the oxygen content and/or an increase in the CO content is detected by means of sensors 43 and 44, this data is transferred to the central control and computer unit 34 that performs oxygen mass flow balancing between the underfire combustion gas and the overfire combustion gas. This is done by throttling the underfire gas flow via at least one of the branch ducts 13a to 13e. This reduces the oxygen mass flow provided to the underfire combustion gas including ambient air. The individual control devices in the branch ducts 13a to 13e are denoted by the reference number 45 and are influenced by the control lines 46 that branch off from the line 33 which is embodied in practice as a bus. The output of the fan 12 for the ambient air can also be reduced in total via the control line 47. Provided pure oxygen is supplied to the ambient air via the ducts 31a to 31e, the supply of oxygen can be reduced by means of the valves 35a to 35e. These control valves 35a to 35e are connected to the bus 33 and therefore to the central control and computer unit 34 via control lines.

The reduction in the oxygen mass flow in the underfire combustion gas is accompanied by corresponding oxygen balancing achieved by increasing the oxygen mass flow in the overfire combustion gas area. For this purpose, oxygen supplied from the conveying and distribution apparatus 30 via the duct 32 is regulated by means of the valves 36 and is added to the internally recirculated flue gas that is introduced via the nozzles 19 und 20, or is regulated by means of the valves 39 and is added to the overfire combustion gas that is available in the form of ambient air or in the form of a mixture of ambient air and cleaned flue gas. Depending on the arrangement of the combustion plant, the overfire combustion gas used to achieve oxygen balancing can be introduced either at a few points in the flue gas pass or at a very large number of individual points. If the overfire combustion gas, whose composition is changed in order to change the oxygen mass flow, is introduced at a few points, it is expedient to first create a homogenization zone in the flue gas pass by supplying cleaned flue gas in turbulent form. The overfire combustion gas with the modified oxygen mass flow is then introduced via this homogenization zone. It is expedient when introducing internally recirculated flue gas to do so at points that have particularly high turbulence and therefore particularly high homogeneity. The arrangement of very many overfire combustion gas supply nozzles has the advantage that oxygen mass flow balancing can take place directly above the points or locations at which an increase in combustion intensity was detected. With this mode of operation the homogenization zone generates additional homogeneity and therefore additional combustion of CO because, even with a larger number of supply nozzles for the overfire combustion gas, because it cannot always be ruled out that individual CO gas veins will form and rise unaffected by the first introduction of overfire combustion gas.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for incinerating waste by combusting fuel in a furnace of a combustion plant having a fuel bed, a flue gas flow above the fuel bed, a combustion grate having a plurality of undergrate air zones and a plurality of independent primary gas supplies arranged beneath the combustion grate, the method comprising the steps of:
   introducing underfire combustion gas into the fuel bed from below;
   introducing overfire combustion gas into the flue gas flow;
   reducing oxygen mass flow of the underfire combustion gas and increasing oxygen mass flow of the overfire combustion gas upon an increase in reaction rate or combustion intensity in the furnace of the combustion plant, different quantities of oxygen being supplied to each of said plural undergrate air zones and different quantities of oxygen being supplied at different times and different locations of the furnace of the combustion plant; and
   introducing ambient air or internally re-circulated flue gas into the flue gas flow at an introduction level of approximately 6 to 9 meters above the combustion grate;
   wherein the increase of the oxygen mass flow in the overfire combustion gas substantially corresponds to the reduction of the oxygen mass flow in the underfire combustion gas;
   wherein the underfire combustion gas and overfire combustion gas are controlled so that the flue gas flow remains constant when the oxygen mass flow of the underfire combustion gas is reduced and oxygen mass flow of the overfire combustion gas is increased; and
   wherein combustion in the furnace of the combustion plant is controlled such that less oxygen is consumed above the combustion grate when a greater level of oxygen is supplied beneath the incineration grate and such that more oxygen is consumed above the combustion grate when a lower level of oxygen is supplied beneath the incineration grate to achieve optimum incineration of waste on the combustion grate; and
   wherein the fuel bed is formed on the combustion grate of the furnace.

2. The method of claim 1, wherein at least one of fuel bed temperature, flue gas temperature, flue gas oxygen content, flue gas $CO_2$ content, and flue gas CO content is measured to regulate the oxygen mass flow in the underfire combustion gas and in the overfire combustion gas.

3. The method of claim 1, wherein the underfire combustion gas has an oxygen content of greater than about 21% by volume.

4. The method of claim 1, wherein the overfire combustion gas comprises ambient air.

5. The method of claim 1, wherein the overfire combustion gas comprises internally re-circulated flue gas extracted at a point in the furnace of the combustion plant where the flue gas contains the oxygen.

6. The method of claim 1, wherein the overfire combustion gas comprises cleaned re-circulated flue gas.

7. The method of claim 4, wherein the overfire combustion gas further comprises cleaned re-circulated flue gas and internally recirculated flue gas.

8. The method of claim 6, wherein the furnace of the combustion plant has a primary combustion zone above the fuel bed, and the cleaned re-circulated flue gas is introduced into the flue gas flow above the primary combustion zone for homogenization and cooling.

9. The method of claim 1, wherein the reduction of the oxygen mass flow in the underfire combustion occurs where there is an increase in the reaction rate or combustion intensity, and the increase of the oxygen mass flow in the overfire combustion gas occurs above where there is an increase in the reaction rate or combustion intensity.

10. The method of claim 1, wherein the furnace of the combustion plant further has a primary combustion zone directly above the fuel bed, and the method further comprising the step of:
    measuring at least one of fuel bed temperature, flue gas temperature, flue gas oxygen content, flue gas $CO_2$ content, and flue gas CO content in the primary combustion zone to establish a location and extent of an increase in the reaction rate or combustion intensity; and
    wherein the oxygen mass flow in the underfire combustion gas and in the overfire combustion gas are regulated based upon the measured at least one of fuel bed temperature, flue gas temperature, flue gas oxygen content, flue gas $CO_2$ content, and flue gas CO content in the primary combustion zone.

11. The method of claim 9, wherein the furnace of the combustion plant further has a primary combustion zone directly above the fuel bed, and the method further comprising the step of:
    measuring at least one of fuel bed temperature, flue gas temperature, flue gas oxygen content, flue gas $CO_2$ content, and flue gas CO content in the primary combustion zone to establish a location and extent of an increase in the reaction rate or combustion intensity; and
    wherein the oxygen mass flow in the underfire combustion gas and in the overfire combustion gas are regulated based upon the measured at least one of fuel bed temperature, flue gas temperature, flue gas oxygen content, flue gas $CO_2$ content, and flue gas CO content in the primary combustion zone.

12. The method of claim 1, wherein oxygen balancing between the underfire combustion gas and the overfire combustion gas is achieved by reducing flow of the underfire combustion gas and by increasing flow of the overfire combustion gas.

13. The method of claim 1, wherein oxygen balancing between the underfire combustion gas and the overfire combustion gas is achieved by reducing oxygen content in the underfire combustion gas and by increasing oxygen content in at least one of components of the overfire combustion gas.

14. The method of claim 5, wherein oxygen balancing between the underfire combustion gas and the overfire combustion gas is achieved by regulating flow of the internally re-circulated flue gas.

15. The method of claim 1, wherein the overfire combustion gas with the increased oxygen mass flow is introduced into an area of the flue gas flow with increased turbulence.

16. The method of claim 1, wherein the overfire combustion gas is introduced into an area where increased turbulence is achieved by a narrowing of the furnace.

17. The method of claim 1, wherein the overfire combustion gas is introduced into the flue gas flow at a plurality of heights above the fuel bed.

18. The method of claim 1, wherein flue gas resides between the fuel bed and the introduction level for a residence time of 1 to 3 seconds.

* * * * *